United States Patent
Shimamura et al.

(10) Patent No.: US 10,277,773 B2
(45) Date of Patent: Apr. 30, 2019

(54) FACSIMILE RECEIVED DATA MANAGEMENT APPARATUS, FACSIMILE RECEIVED DATA MANAGEMENT SYSTEM, AND NON-TRANSITORY COMPUTER READABLE MEDIUM FOR AUTOMATICALLY SORTING RECEIVED DOCUMENTS IN FACSIMILE COMMUNICATIONS

(71) Applicant: FUJI XEROX CO., LTD., Tokyo (JP)

(72) Inventors: Shinji Shimamura, Kanagawa (JP); Toshiharu Yokoyama, Kanagawa (JP); Rei Yamada, Kanagawa (JP); Yusuke Kawano, Kanagawa (JP); Tadanobu Miyauchi, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 42 days.

(21) Appl. No.: 15/449,121

(22) Filed: Mar. 3, 2017

(65) Prior Publication Data

US 2018/0084139 A1    Mar. 22, 2018

(30) Foreign Application Priority Data

Sep. 21, 2016 (JP) .................................. 2016-184108

(51) Int. Cl.
*H04N 1/32* (2006.01)
*H04N 1/21* (2006.01)

(52) U.S. Cl.
CPC ......... *H04N 1/3209* (2013.01); *H04N 1/2104* (2013.01); *H04N 2201/0093* (2013.01)

(58) Field of Classification Search
None
See application file for complete search history.

(56) References Cited

U.S. PATENT DOCUMENTS

2004/0051896 A1* 3/2004 Saitoh ................ H04N 1/00641
358/1.13

FOREIGN PATENT DOCUMENTS

| JP | 2000-022824 A | 1/2000 |
| JP | 2004-112328 A | 4/2004 |

* cited by examiner

*Primary Examiner* — Andrew H Lam
(74) *Attorney, Agent, or Firm* — Oliff PLC

(57) ABSTRACT

A facsimile received data management apparatus includes: a receiving part that receives facsimile received data; a first registration part that registers the facsimile received data in a storage place associated with a facsimile sender of the facsimile received data in a case where the storage place associated with the facsimile sender is prepared in advance; and a second registration part that registers the facsimile received data in a storage place for unclassified data in a case where the storage place associated with the facsimile sender is not prepared in advance.

9 Claims, 4 Drawing Sheets

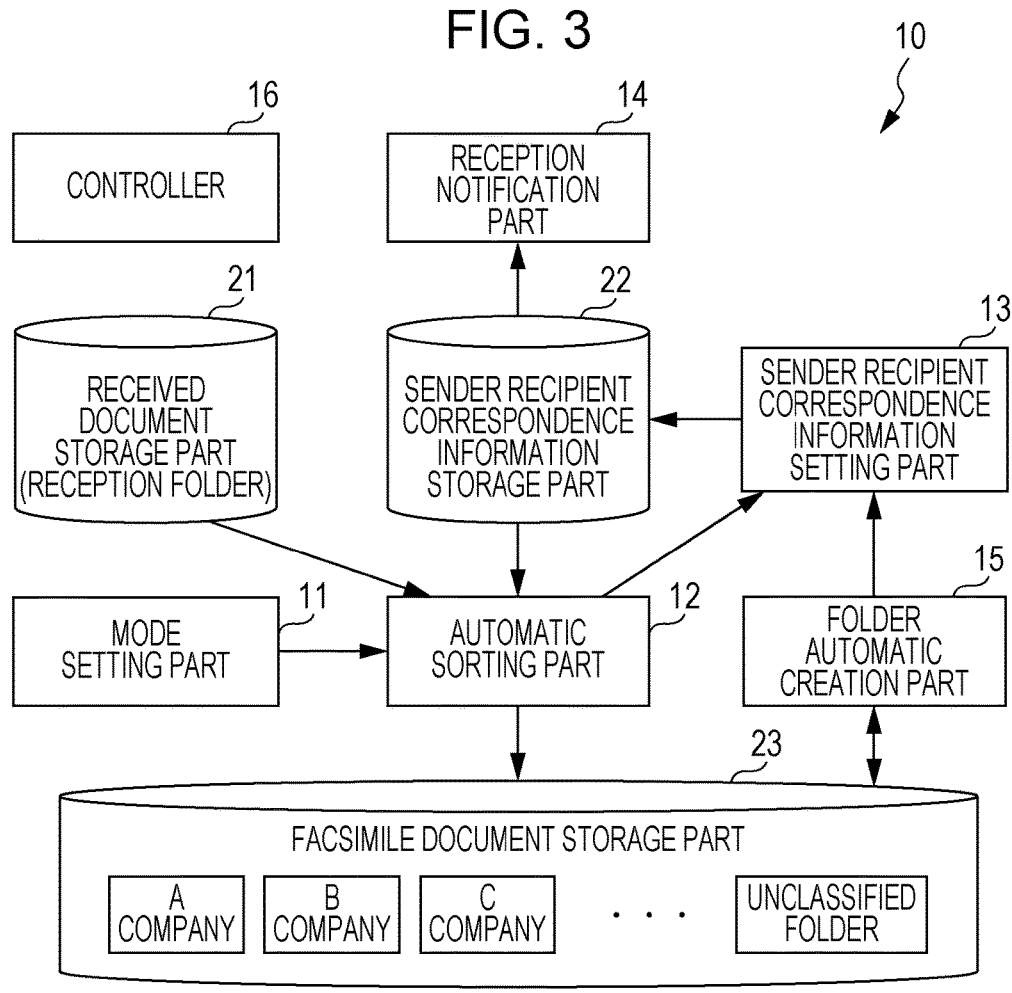

FACSIMILE RECEIVED DATA MANAGEMENT APPARATUS, FACSIMILE RECEIVED DATA MANAGEMENT SYSTEM, AND NON-TRANSITORY COMPUTER READABLE MEDIUM FOR AUTOMATICALLY SORTING RECEIVED DOCUMENTS IN FACSIMILE COMMUNICATIONS

CROSS-REFERENCE TO RELATED APPLICATIONS

This application is based on and claims priority under 35 USC 119 from Japanese Patent Application No. 2016-184108 filed Sep. 21, 2016.

BACKGROUND

Technical Field

The present invention relates to a facsimile received data management apparatus, a facsimile received data management system, and a non-transitory computer readable medium.

SUMMARY

According to an aspect of the present invention, there is provided a facsimile received data management apparatus including: a receiving part that receives facsimile received data; a first registration part that registers the facsimile received data in a storage place associated with a facsimile sender of the facsimile received data in a case where the storage place associated with the facsimile sender is prepared in advance; and a second registration part that registers the facsimile received data in a storage place for unclassified data in a case where the storage place associated with the facsimile sender is not prepared in advance.

BRIEF DESCRIPTION OF THE DRAWINGS

An exemplary embodiment of the present invention will be described in detail based on the following figures, wherein:

FIG. 3 is a block diagram illustrating a configuration of the document management apparatus according to the present exemplary embodiment;

FIG. 4 is a diagram illustrating an example of a data configuration of sender recipient correspondence information stored in a sender recipient correspondence information storage part according to the present exemplary embodiment;

DETAILED DESCRIPTION

An exemplary embodiment of the present invention is described below with reference to the drawings.

Figure 1:
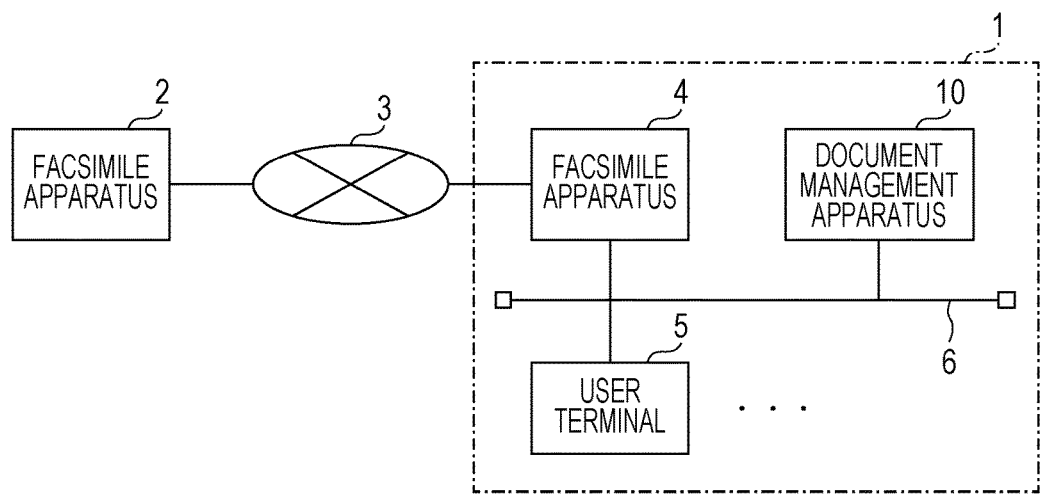
FIG. 1 is a diagram illustrating an overall configuration of a document management system according to the present exemplary embodiment.

FIG. 1 is a diagram illustrating an overall configuration of a document management system according to the present exemplary embodiment. FIG. 1 illustrates a configuration in which a document management system 1 and an outside facsimile apparatus 2 are connected over a network 3. In the document management system 1, a facsimile apparatus 4, a user terminal 5, and a document management apparatus 10 are connected over a local area network (LAN) 6. The facsimile apparatus 4 receives facsimile data transmitted from the facsimile apparatus 2. In the present exemplary embodiment, it is assumed that the facsimile apparatus 4 is a multi-function printer having a facsimile function, which is one form of an image forming apparatus. The user terminal 5 is an information processing apparatus used by a user who is a recipient of facsimile received data (hereinafter referred to as a "facsimile document") received by the facsimile apparatus 4. In the present exemplary embodiment, it is assumed that the user terminal 5 is a personal computer (PC). The document management system 1 may include plural user terminals 5, but the plural user terminals 5 need just have equivalent functions to implement the present exemplary embodiment, and therefore only one user terminal 5 is illustrated in FIG. 1 for convenience of illustration. Furthermore, the document management system 1 may include plural facsimile apparatuses 2, which are transmission sources of facsimile documents, but only one facsimile apparatus 2 is illustrated in FIG. 1 for convenience of illustration. The document management apparatus 10 is a server computer that manages a facsimile document received by the facsimile apparatus 4.

Figure 2:
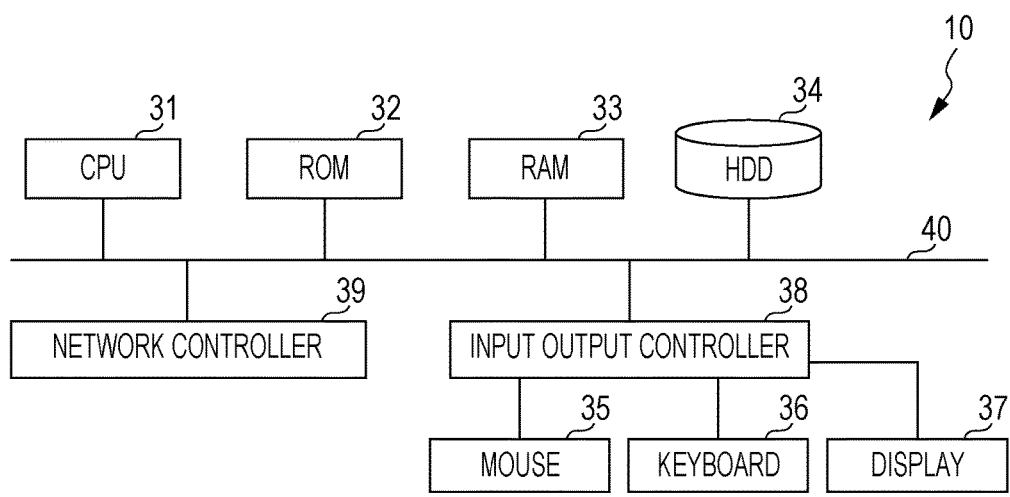
FIG. 2 is a diagram illustrating a hardware configuration of a server computer that serves as a document management apparatus according to the present exemplary embodiment.

FIG. 2 is a diagram illustrating a hardware configuration of a server computer that serves as the document management apparatus 10 according to the present exemplary embodiment. In the present exemplary embodiment, the server computer that serves as the document management apparatus 10 can be a conventionally known general-purpose hardware configuration. Specifically, the document management apparatus 10 is configured such that an input output controller 38 that connects to a CPU 31, a ROM 32, a RAM 33, a hard disc drive (HDD) 34, a mouse 35 and a keyboard 36 serving as input units, and a display 37 serving as a display device and a network controller 39 serving as a communication unit are connected to an internal bus 40, as illustrated in FIG. 2.

FIG. 3 is a block diagram illustrating a configuration of the document management apparatus 10 according to the present exemplary embodiment. The document management apparatus 10 according to the present exemplary embodiment includes a mode setting part 11, an automatic sorting part 12, a sender recipient correspondence information setting part 13, a reception notification part 14, a folder automatic creation part 15, a controller 16, a received document storage part 21, a sender recipient correspondence information storage part 22, and a facsimile document storage part 23. Constituent elements that are not used in description of the present exemplary embodiment are omitted in FIG. 3.

The mode setting part 11 functions as a setting part that selects, in accordance with a predetermined criterion, an unclassified registration mode (also referred to as a "manual creation mode") in which a facsimile document is registered in an unclassified folder or a storage place creation mode (also referred to as an "automatic creation mode") in which a folder associated with a facsimile sender is created and a facsimile document is registered in this folder.

The automatic sorting part 12 registers a facsimile document in a folder associated with a facsimile sender of the facsimile document in accordance with sender recipient correspondence information stored in the sender recipient correspondence information storage part 22 when the facsimile document is registered in the received document storage part 21. In a case where there is no folder associated with the facsimile sender, the automatic sorting part 12 operates in a mode set by the mode setting part 11. In particular, in a case where the manual creation mode is selected, the automatic sorting part 12 functions as a registration part that registers the facsimile document in an unclassified folder.

The sender recipient correspondence information setting part 13 sets and registers sender recipient correspondence information in the sender recipient correspondence information storage part 22. The reception notification part 14 notifies a recipient specified by referring to the sender recipient correspondence information about registration of a facsimile document in a folder when the facsimile document is registered in a folder that is not an unclassified folder in the facsimile document storage part 23. In the present exemplary embodiment, the document management apparatus 10 is given a function of notifying a recipient by providing the reception notification part 14. Alternatively, for example, an existing notification function offered by an outside application may be used. The folder automatic creation part 15 functions as a creation part that creates a folder associated with a facsimile sender of a facsimile document on the basis of a file name of the facsimile document that is selected from an unclassified folder in accordance with an operation instruction given by an administrator and registers the facsimile document in the created folder. The controller 16 manages a facsimile document in cooperation with the constituent elements 11 through 15.

The received document storage part 21 is a reception folder in which a facsimile document received by the facsimile apparatus 4 is written. In the facsimile document storage part 23, a folder associated with a facsimile sender is provided. In the present exemplary embodiment, an unclassified folder in which a facsimile document from a facsimile sender that is not registered in the sender recipient correspondence information storage part 22 is further provided in the facsimile document storage part 23.

FIG. 4 is a diagram illustrating an example of a data configuration of the sender recipient correspondence information stored in the sender recipient correspondence information storage part 22 according to the present exemplary embodiment. The sender recipient correspondence information includes a sender, a sender number, a folder name, a receiver number, and recipient information. The sender is a name of a company that is a transmission source of a facsimile document. The sender number is a telephone number of a transmission source of a facsimile document and is information that can identify the transmission source. The folder name is a name of a folder associated with a facsimile sender. In the present exemplary embodiment, the sender number that is identification information of a facsimile sender is used as the folder name. The folder name may be a company name or the like as long as a facsimile sender and a folder are associated with each other and a recipient can recognize the folder as a folder in which a facsimile document that should be received by the recipient is stored. The receiver number is a telephone number of the facsimile apparatus 4 that has received a facsimile document. It is assumed that plural facsimile apparatuses 4 are connected to the LAN 6 and different processes are performed by the facsimile apparatuses 4. The recipient information is information indicative of a destination of a notification of facsimile reception to a user who receives a facsimile document registered in a folder. In the present exemplary embodiment, it is assumed that a notification is given by using an e-mail, and therefore an e-mail address is set as the recipient information. A method for notification is not limited to an e-mail, and other tools can be used. As illustrated in the setting example of FIG. 4 and as easily imagined from an ordinary course of business, a single recipient can be a recipient of facsimile documents from plural senders. The sender, the sender number, and the receiver number included in the sender recipient correspondence information can be set by referring to information attached to a facsimile document.

The constituent elements 11 through 16 of the document management apparatus 10 are provided by cooperation of the computer serving as the document management apparatus 10 and programs running on the CPU 31 mounted in the computer. The storage parts 21 through 23 are provided by using the HDD 34 mounted in the document management apparatus 10. Alternatively, the RAM 33 or an outside storage part may be used via a network.

The programs used in the present exemplary embodiment may be provided by a communication part or may be provided by storing the programs in a computer readable recording medium such as a CD-ROM or a USB memory. The programs provided by the communication part or recording medium is installed in the computer, and the CPU of the computer sequentially executes the programs. Thus, various processes are performed.

Next, an operation according to the present exemplary embodiment is described. In the present exemplary embodiment, a facsimile document received by the facsimile apparatus 4 is sorted and registered into any of the folders. A document sorting process in the present exemplary embodiment is described with reference to the flowchart illustrated in FIG. 5.

When the facsimile apparatus 4 receives a facsimile document transmitted from the outside facsimile apparatus 2, the facsimile document is written and stored in the received document storage part 21. To the facsimile document, attribute information such as a sender, a sender number, a receiver number, and reception date and time is attached. The document management apparatus 10 is always waiting for registration of a facsimile document in the received document storage part 21 (N in Step 101). Upon detection of registration of a facsimile document in the received document storage part 21 (Y in Step 101), the automatic sorting part 12 checks the presence or absence of sender recipient information including a sender number attached to the facsimile document by referring to the sender recipient correspondence information storage part 22. In other words, the automatic sorting part 12 checks whether or not there is a folder associated with the sender. In a case where there is a folder associated with the facsimile sender (Y in Step 102), the automatic sorting part 12 registers the facsimile document in this folder (Step 103).

When the facsimile document is registered in any of the folders of the facsimile document storage part 23, the reception notification part 14 acquires recipient information associated with the folder by referring to the sender recipient correspondence information storage part 22 under control of the controller 16. Then, the reception notification part 14 notifies the recipient of reception of the facsimile document by transmitting an e-mail to the address indicated by the recipient information (Step 104). A name of the folder in which the facsimile document is stored may be described in the e-mail because the recipient is sometimes associated with plural folders. The function provided by the reception notification part 14 may be offered by using an outside application.

Upon notification of reception of the facsimile document that should be received by the recipient, the recipient who should receive the facsimile document specifies the folder in which the facsimile document is stored on the basis of the folder name and takes out the facsimile document from the folder. The aforementioned processes are a basic operation of the present exemplary embodiment and can be similar to conventional ones. The facsimile document stored in the received document storage part 21 may be deleted at the same timing as the conventional art.

Meanwhile, in a case where there is no folder associated with the facsimile sender (N in Step 102), the automatic sorting part 12 performs the following processes in accordance with a mode set by the mode setting part 11. A criterion by which the mode setting part 11 sets a mode will be described later.

In a case where the manual creation mode is set (N in Step 105), the automatic sorting part 12 registers the facsimile document in an unclassified folder (Step 110). The file name of the facsimile document registered in the unclassified folder includes attribute information of the facsimile sender. In the present exemplary embodiment, the sender number is used as a folder name, and therefore the file name of the facsimile document is created by using the sender and the sender number as the attribute information of the facsimile sender. The file name may include a receiver number for generation of sender recipient correspondence information. There are cases where a facsimile document is transmitted plural times from the same facsimile sender. In view of this, the file name may include, for example, reception date and time so that the facsimile documents can be distinguished.

Meanwhile, in a case where the automatic creation mode is set (Y in Step 105), the automatic sorting part 12 newly creates a folder by using the sender number attached to the facsimile document (Step 106) and registers the facsimile document in this folder (Step 107).

Next, the automatic sorting part 12 operates in cooperation with the sender recipient correspondence information setting part 13 under control of the controller 16. Specifically, the sender recipient correspondence information setting part 13 prompts an administrator to input recipient information of a recipient of the received facsimile document, for example, by displaying a recipient information setting screen. Upon input of the recipient information by the administrator, the sender recipient correspondence information setting part 13 generates sender recipient correspondence information including the recipient information and a sender, a sender number, a receiver number, and a folder number specified from the information attached to the facsimile document and sets and registers the sender recipient correspondence information in the sender recipient correspondence information storage part 22 (Step 108).

Upon detection of registration of the facsimile document in any of the folders of the facsimile document storage part 23, the reception notification part 14 acquires recipient information associated with the folder by referring to the sender recipient correspondence information storage part 22 under control of the controller 16 and notifies the recipient of reception of the facsimile document by transmitting an e-mail to the recipient (Step 109).

In the present exemplary embodiment, facsimile documents for which no recipient has been determined are collectively stored in the unclassified folder. This means that a recipient has been associated with a folder given a sender number as a name. Therefore, the administrator may easily recognize a facsimile document stored in the unclassified folder as a facsimile document for which a recipient should be set.

An operation procedure in which the administrator allocates a recipient to a facsimile document stored in the unclassified folder and sets and registers sender recipient correspondence information in the sender recipient correspondence information storage part 22 is described below.

The administrator opens the unclassified folder and selects a facsimile document to be processed. Then, the administrator creates a new folder. A sender number used as a folder name can be obtained from a file name of the selected facsimile document. Then, the administrator moves the selected facsimile document into the new folder. The aforementioned administrator's operation can be executed by using a file management function that is a standard function of the document management apparatus 10, for example, Explorer (Registered Trademark) in a case where Windows (Registered Trademark) is used as an OS.

Furthermore, the administrator activates the sender recipient correspondence information setting part 13. The sender recipient correspondence information setting part 13 activated by the administrator prompts the administrator to input recipient information of a recipient of the moved facsimile document, for example, by displaying a recipient information setting screen. Upon input of the recipient information by the administrator, the sender recipient correspondence information setting part 13 generates sender recipient correspondence information including the recipient information and a sender, a sender number, a receiver number, and a folder name that are specified from the information attached to the facsimile document and sets and registers the sender recipient correspondence information in the sender recipient correspondence information storage part 22. Furthermore, when the facsimile document is moved and registered in the new folder, the reception notification part 14 notifies the recipient of reception of the facsimile document by e-mail by referring to the sender recipient correspondence information under control of the controller 16.

Figure 5:
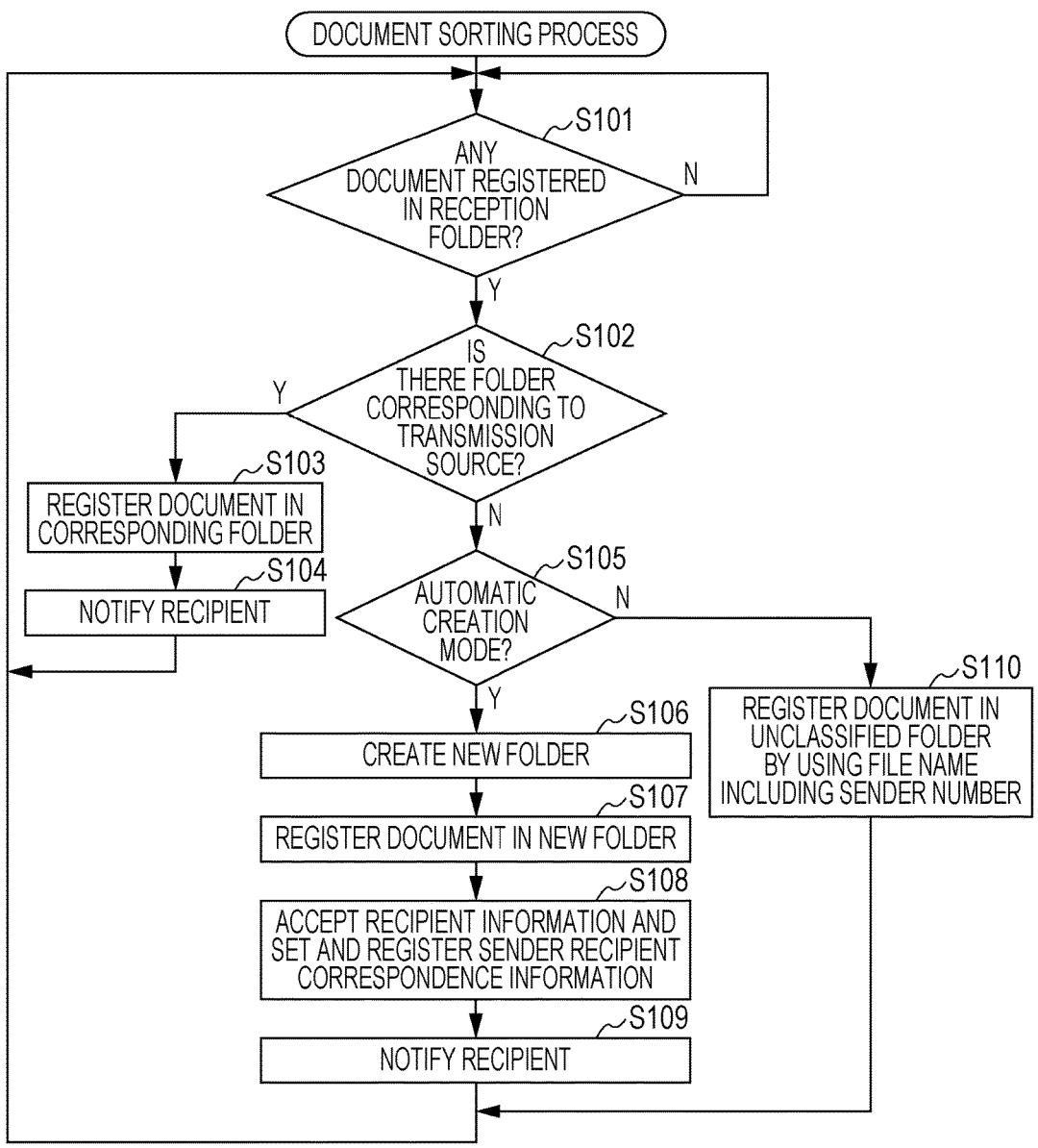
FIG. 5 is a flowchart illustrating a document sorting process according to the present exemplary embodiment.
Figure 6:
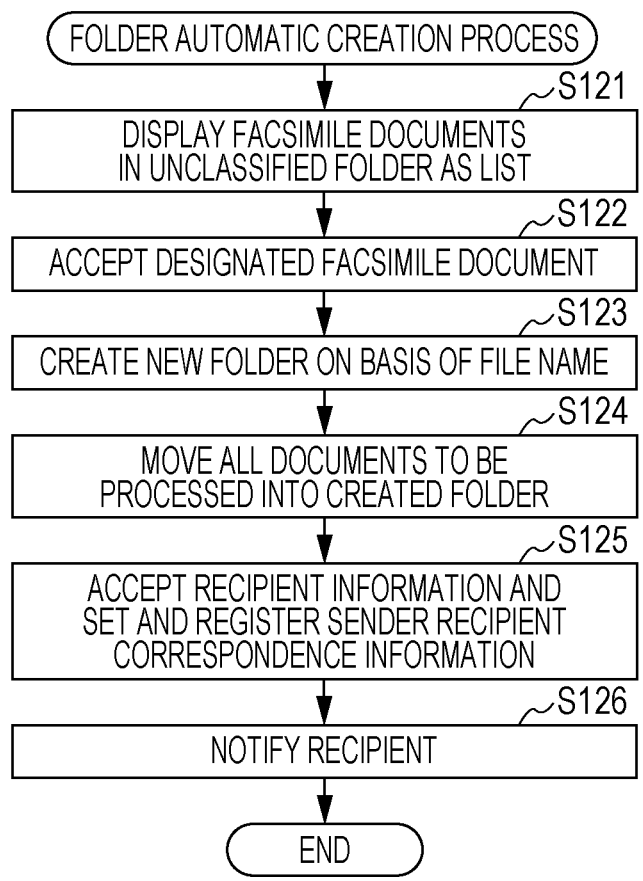
FIG. 6 is a flowchart illustrating a folder automatic creation process according to the present exemplary embodiment.

In a case where the manual creation mode is set in the document sorting process illustrated in FIG. 5, the administrator need to, for example, manually create a folder and move a facsimile document as described above so that the facsimile document is automatically sorted. The folder automatic creation part 15 allows the aforementioned processes to be automatically performed. The folder automatic creation process in the folder automatic creation part 15 is described below with reference to the flowchart illustrated in FIG. 6.

Upon activation, the folder automatic creation part 15 causes facsimile documents stored in an unclassified folder to be displayed in a list (Step 121). When an administrator designates a facsimile document for which a folder is to be created from the list, the folder automatic creation part 15 accepts the designated facsimile document (Step 122). Then, the folder automatic creation part 15 creates a new folder by using, as a name, a sender number included in a file name of the facsimile document (Step 123) and moves the designated facsimile document into the created folder (Step 124).

Next, the folder automatic creation part 15 operates in cooperation with the sender recipient correspondence information setting part 13 under control of the controller 16. Specifically, the sender recipient correspondence information setting part 13 prompts the administrator to input recipient information of a recipient of the received facsimile document, for example, by displaying a recipient information setting screen. Upon input of the recipient information by the administrator, the sender recipient correspondence information setting part 13 generates sender recipient correspondence information including the recipient information and a sender, a sender number, a receiver number, and a folder name that are specified from information attached to the facsimile document and sets and registers the sender recipient correspondence information in the sender recipient correspondence information storage part 22 (Step 125). When the facsimile document is registered in the new folder, the reception notification part 14 acquires recipient information associated with the folder by referring to the sender recipient correspondence information storage part 22 under control of the controller 16 and notifies the recipient of reception of the facsimile document by e-mail (Step 126).

By thus creating a folder and sender recipient correspondence information that are associated with a sender, a facsimile document sent from the facsimile sender hereafter is registered in the folder associated with the facsimile sender without being sorted into the unclassified folder, and thus a recipient is notified of reception of the facsimile document from the facsimile sender.

In some cases, plural facsimile documents from the same facsimile sender are stored in the unclassified folder. In view of this, a facsimile document including, in a file name, the same sender number as the facsimile document selected by the administrator may be also moved into the new folder.

A mode set by the mode setting part 11 is described below. As described above, in the present exemplary embodiment, an unclassified registration mode (manual creation mode) in which a facsimile document is registered in an unclassified folder and a storage place creation mode (automatic creation mode) in which a folder associated with a facsimile sender is created and a facsimile document is registered in this folder are prepared for a case where there is no folder associated with a facsimile sender.

In a case where there is no folder associated with a facsimile sender of a received facsimile document, a folder is automatically created unconditionally in the conventional art. In this case, however, a folder of a facsimile sender with which a recipient has been associated and a folder with which no recipient has been associated are displayed without distinction. Therefore, the administrator and the recipient may not distinguish these folders.

In view of this, in the present exemplary embodiment, the manual creation mode is prepared so that a facsimile document for which no folder associated with a facsimile sender has been created is sorted into an unclassified folder. This makes it possible to know at a glance that a recipient has been associated with a folder using a sender number as a name. The unclassified folder uses a name that is not similar to the sender number. It is, however, necessary to associate a recipient with the facsimile document sorted into the unclassified folder some time. In this case, without the folder automatic creation part 15, the administrator need to perform a troublesome operation of creating a folder by designating a folder name and moving a facsimile document by himself or herself.

Assume that priority is placed on avoidance of mixture of a folder of a facsimile sender with which a recipient has been associated and a folder with which no recipient has been associated, and the aforementioned situation is taken into consideration. In the present exemplary embodiment, in a case where the number of facsimile documents (hereinafter referred to as "recipient unknown documents") from a facsimile sender with which no recipient has been associated is relatively large, the facsimile documents are sorted into the unclassified folder in the manual creation mode. Meanwhile, in a case where the number of recipient unknown documents is relatively small, a folder associated with a facsimile sender is created in the automatic creation mode, and a recipient is associated each time. It is considered that burden on the administrator is not so large because the number of receptions of a recipient unknown document is relatively small.

The mode setting part 11 sets a mode in accordance with such a predetermined criterion. Specifically, the mode setting part 11 monitors a state of registration in the unclassified folder. In a case where the number of registrations in the unclassified folder during a predetermined period (e.g. 1 week) is equal to or larger than a predetermined threshold value, the mode setting part 11 determines that the number of receptions of a recipient unknown document is large and sets the manual creation mode. Otherwise, the mode setting part 11 sets the automatic creation mode. Alternatively, the mode setting part 11 sets the manual creation mode by default and switches the mode to the automatic creation mode when the number of receptions of a recipient unknown document becomes less than the predetermined threshold value.

Mode setting described above is an example, and the present exemplary embodiment is not limited to this. For example, a mode selected by the administrator may be set. Alternatively, in a case where the facsimile apparatus 4 uses, for a certain facsimile sender, a confidential box in which facsimile documents are stored, a mode may be associated with the confidential box. Alternatively, the mode may be set in accordance with information attached to a facsimile document such as a receiver number. That is, it is unnecessary to set the same mode in the whole system.

As described above, according to the present exemplary embodiment, in which a recipient unknown document is registered in an unclassified folder, it is possible to easily distinguish a facsimile document for which a recipient has been determined and a facsimile document for which no recipient has been determined.

If a facsimile document is sent, for example, from a suspicious person or for an unnecessary advertisement, one who receives such a facsimile document wants to discard the facsimile document without setting of a recipient. If a folder associated with such a facsimile sender is automatically created, it takes a trouble to discard the folder. In the present exemplary embodiment, an unnecessary facsimile document is registered in an unclassified folder, and it is therefore easy to discard the facsimile document.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A facsimile received data management apparatus comprising:
a processor programmed to:
receive facsimile received data;

register the facsimile received data in a storage place associated with a facsimile sender of the facsimile received data when the storage place associated with the facsimile sender is prepared before receipt of the facsimile received data;

when the storage place associated with the facsimile sender is not prepared before receipt of the facsimile received data, determine whether an unclassified registration mode has been set or a storage place creation mode has been set;

when it is determined that the unclassified registration mode has been set, register the facsimile received data in the storage place for unclassified data; and when it is determined that the storage place creation mode has been set, create a storage place associated with the facsimile sender and register the facsimile received data in the created storage place.

2. The facsimile received data management apparatus according to claim 1, wherein the processor is further programmed to switch between the unclassified registration mode and the storage place creation mode in accordance with the number of pieces of facsimile received data received by the facsimile received data management apparatus.

3. The facsimile received data management apparatus according to claim 2, wherein the processor is further programmed to switch the mode from the storage place creation mode to the unclassified registration mode when the number of pieces of facsimile received data received by the facsimile received data management apparatus is equal to or larger than a predetermined threshold value.

4. The facsimile received data management apparatus according to claim 1, wherein the processor is further programmed to register the facsimile received data in the storage place for unclassified data by using, in a file name of the facsimile received data, attribute information of the facsimile sender of the facsimile received data.

5. The facsimile received data management apparatus according to claim 4, wherein the processor is further programmed to create a storage place associated with the facsimile sender based on the file name of the facsimile received data selected from the storage place for unclassified data and registers the facsimile received data in the created storage place.

6. The facsimile received data management apparatus according to claim 1, wherein the processor is further programmed to register the facsimile received data in the storage place for unclassified data by using, in a file name of the facsimile received data, attribute information of the facsimile sender of the facsimile received data.

7. The facsimile received data management apparatus according to claim 6, wherein the process is further programmed to create a storage place associated with the facsimile sender based on the file name of the facsimile received data selected from the storage place for unclassified data and registers the facsimile received data in the created storage place.

8. A facsimile received data management system comprising:

a facsimile apparatus;

a facsimile received data management apparatus that registers and manages facsimile received data in a storage place associated with a facsimile sender of the facsimile received data, the facsimile received data management apparatus including a processor programmed to:

accept facsimile received data received by the facsimile apparatus;

register the facsimile received data in a storage place associated with a facsimile sender of the facsimile received data when the storage place associated with the facsimile sender is prepared before receipt of the facsimile received data; and when the storage place associated with the facsimile sender is not prepared before receipt of the facsimile received data, determine whether an unclassified registration mode has been set or a storage place creation mode has been set;

when it is determined that the unclassified registration mode has been set, register the facsimile received data in the storage place for unclassified data; and when it is determined that the storage place creation mode has been set, create a storage place associated with the facsimile sender and register the facsimile received data in the created storage place.

9. A non-transitory computer readable medium storing a program causing a computer to execute a process for facsimile received data management, the process comprising:

receiving facsimile received data;

registering the facsimile received data in a storage place associated with a facsimile sender of the facsimile received data when the storage place associated with the facsimile sender is prepared before receipt of the facsimile received data; and when the storage place associated with the facsimile sender is not prepared before receipt of the facsimile received data, determining whether an unclassified registration mode has been set or a storage place creation mode has been set;

when it is determined that the unclassified registration mode has been set, registering the facsimile received data in the storage place for unclassified data; and when it is determined that the storage place creation mode has been set, creating a storage place associated with the facsimile sender and register the facsimile received data in the created storage place.

* * * * *